Sept. 28, 1948.　　　　　G. KNOX　　　　　2,450,004
LATHE SPINDLE STOP
Filed July 21, 1945
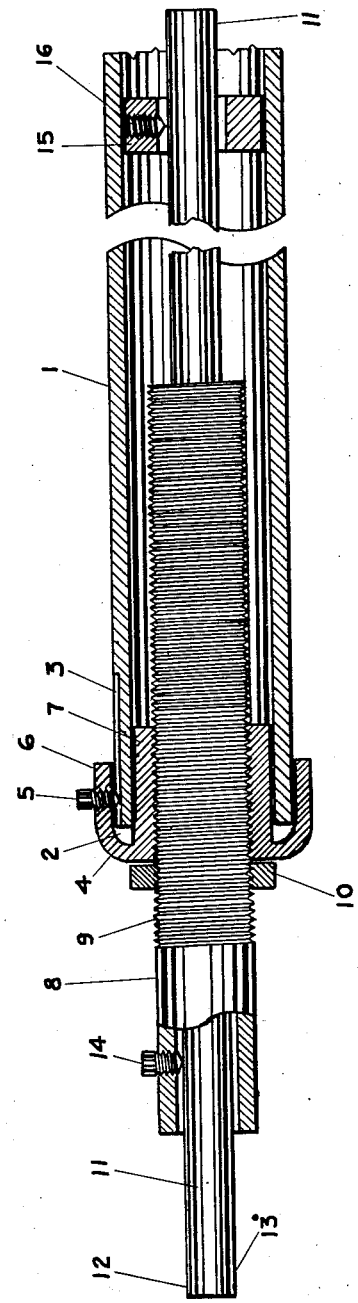
INVENTOR.
GRAHAM KNOX
BY
ATTORNEY Patented Sept. 28, 1948

2,450,004

UNITED STATES PATENT OFFICE 2,450,004

LATHE SPINDLE STOP

Graham Knox, San Francisco, Calif.

Application July 21, 1945, Serial No. 606,462

2 Claims. (Cl. 82—34)

(Granted under the act of March 3, 1883, as amended April 30, 1928; 370 O. G. 757)

This invention relates to a lathe spindle stop and more particularly to an adjustable stop for positioning pieces of material in a lathe.

In using an engine or turret lathe it is the usual practice to support a piece of material on which machine work is to be performed in some kind of chuck or collet supported on the forward end of a lathe spindle. One end of the piece protrudes outwardly from the chuck or collet to be engaged by a suitable tool. The other end ordinarily extends into the lathe spindle.

When successive pieces are to be machined identically, it has been customary to provide stop means to limit the position of such pieces in the spindle so that they will assume identical position longitudinally in the lathe. However, the means heretofore available in the spindle for limiting the distance that the work piece may be moved inwardly into the spindle have been either relatively complicated so as to require considerable expense in their manufacture or have not been as rapidly adjustable as might be desired.

It is the principal object of the present invention to provide an adjustable stop of simple and inexpensive construction which may be secured to the rearward end of a lathe spindle and which is designed to abut against the inner end of a piece of material on which machine work is to be performed to enable the piece to be easily placed in the desired longitudinal position in the lathe.

It is a further object of the invention to provide for accomplishing the foregoing object in a facile, economical, and efficient manner.

In accomplishing these and other objects of the present invention, I have provided improved details of structure, the preferred form of which is illustrated in the accompanying drawing, wherein the figure is a longitudinal sectional view of a lathe spindle stop embodying the principles of my invention installed on a lathe spindle.

Referring more in detail to the drawing:

There is shown at 1 a lathe spindle which may be embodied in a known type of engine or turret lathe. The spindle 1 is commonly hollow and the forward end portion thereof supports a chuck or collet, not shown, for receiving a piece of material on which machine work is to be performed by the lathe. The opposite or rearward end portion 2 of the spindle 1 protrudes from the rearward end of the lathe. Preferably the rearward end portion 2 has a longitudinally extending groove 3 in an outer side wall to facilitate securing of the stop of my invention thereto.

The stop of my invention preferably comprises a collar 4 secured to the rearward end portion 2 of the spindle 1 by a set screw 5, which is preferably threadedly engaged in a tapped opening in a side wall of the collar and extends into the groove 3 of the spindle 1. The collar 4 preferably has an outer flange portion 6 and an inner flange portion 7 spaced concentrically therein. The rearward end portion 2 of the spindle 1 preferably fits within the space between these two flange portions. The inner flange portion 7 is preferably interiorly threaded.

A hollow bushing 8, having exterior threads 9 extending for at least a portion of its length, is threadedly engaged with the threads on the interior of the inner flange portion 7 of the collar 4. A lock nut 10 is threadedly engaged on the threads 9 of the bushing 8 outwardly of the collar 4 and is adapted to cooperate with the collar to enable the bushing to be secured in adjusted position relative to the collar.

A stop rod 11 is slidably fitted within the bushing 8. The rod 11 is preferably substantially cylindrical except that a pair of diametrically opposed portions of its sides may be flattened, as indicated at 12 and 13, to provide secure bearing surfaces for set screws hereinafter described. Preferably the ends of the rod 11 are squared as accurately as possible.

The rod 11 is preferably secured in adjusted position within the bushing 8 by a set screw 14 which is threadedly engaged in a tapped opening in a side wall of the bushing 8. Preferably the inner end of the set screw 14 engages one of the flattened sides 12 or 13 of the rod 11.

Preferably a guide collar 15 is adjustably secured on the rod 11 somewhat forwardly of the bushing 8 to support the forward end of the rod against sagging within the spindle 1. The guide collar 15 preferably fits closely within the spindle 1 and is secured in adjusted position on the rod 11 by the set screw 16, which is threadedly engaged in a tapped opening in the guide collar and countersunk therein.

Operation

The lathe spindle stop of my invention is assembled and secured to the rearward end of the spindle of an appropriate lathe.

By suitable measuring devices, the proper longitudinal position of a piece of material on which machine work is to be performed within the chuck or collet is determined.

The set screw 14 of the lathe stop is loosened and the stop rod 11 of the lathe stop is slidably moved within the bushing 8 until the forward end thereof is in approximately correct longitudinal position to abut against the piece of material. The set screw 14 is retightened to hold the stop rod 11 securely fixed with respect to the bushing 8. A second measurement may be taken to determine the variance between the approximate adjusted position thus obtained and the exact desired position of the stop rod 11.

The lock nut 10 is loosened and the bushing 8 is rotated within the collar 4 to advance or retard the forward end of the rod 11 the distance necessary to attain the exact desired adjustment. The threads 9 on the bushing 8 are preferably constructed with a known number of threads per inch so that rotation of the bushing 8 through a definite number of turns moves the rod 11 a known distance. The lock nut 10 is retightened to secure the bushing 8 against further rotation.

The piece of material on which machine work is to be performed is inserted within the chuck or collet of the lathe and moved inwardly into the lathe spindle until the end abuts against the forward end of the rod 11. The piece is then in correct longitudinal position for the work that is to be performed on it. Successive pieces placed within the chuck or collet for similar machining operations always occupy the identical relative longitudinal position until the lathe spindle stop is readjusted.

The guide collar 15 supports the forward end portion of the rod 11 against any tendency to sag within the lathe spindle 1.

While I have shown but one embodiment of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. A lathe spindle stop comprising a collar having inner and outer spaced concentric flanges, the space between the flanges being adapted to receive an end of a hollow lathe spindle, means for securing the collar to the spindle, said inner flange being interiorly threaded, a bushing exteriorly threaded for at least a portion of its length threadedly engaged with the threads on said inner flange for longitudinal adjustment with respect thereto, a lock nut threadedly engaged with the threads on said bushing and cooperable with said collar to hold said bushing in adjusted position with respect to said collar, an elongated stop rod slidably fitted within said bushing for longitudinal adjustment therein, means to secure said stop rod in adjusted position with respect to said bushing, an end of said stop rod being adapted to abut against pieces of material on which machine work is to be performed by the lathe, and means to support the stop rod against sagging in the lathe spindle.

2. A lathe spindle stop comprising a collar having inner and outer spaced concentric flanges, the space between the flanges being adapted to receive an end of a hollow lathe spindle, means for securing the collar to the spindle, said inner flange being interiorly threaded, a bushing exteriorly threaded for at least a portion of its length threadedly engaged with the threads on said inner flange for longitudinal adjustment with respect thereto, an elongated stop rod slidably fitted within said bushing for longitudinal adjustment therein, and means to secure said stop rod in adjusted position with respect to said bushing, an end of said stop rod being adapted to abut against pieces of material on which machine work is to be performed by the lathe.

GRAHAM KNOX.

REFERENCES CITED

The following references are of record in the file of this patent:

UNITED STATES PATENTS

| Number | Name | Date |
|---|---|---|
| 1,455,554 | Stercklen | May 15, 1923 |
| 2,201,287 | Cox | May 21, 1940 |